United States Patent
Graf Von Reischach et al.

(10) Patent No.: US 8,730,015 B2
(45) Date of Patent: May 20, 2014

(54) DUPLICATION DETECTION FOR NON-CRYPTOGRAPHIC RFID TAGS USING ENCRYPTED TRACEABILITY INFORMATION

(75) Inventors: Felix Graf Von Reischach, Zurich (CH); Carsten Magerkurth, St. Gallen (CH); Ali Dada, St. Gallen (CH)

(73) Assignee: SAP AG, Walldorf (DE)

( * ) Notice: Subject to any disclaimer, the term of this patent is extended or adjusted under 35 U.S.C. 154(b) by 985 days.

(21) Appl. No.: 12/337,556

(22) Filed: Dec. 17, 2008

(65) Prior Publication Data
US 2010/0148935 A1    Jun. 17, 2010

(51) Int. Cl.
*H04Q 5/22*    (2006.01)

(52) U.S. Cl.
USPC .... 340/10.5; 340/10.51; 340/10.1; 340/572.1

(58) Field of Classification Search
USPC .............. 340/1.1, 10.1–10.6, 572.1–572.9; 235/375–385
See application file for complete search history.

(56) References Cited

U.S. PATENT DOCUMENTS

| | | | |
|---|---|---|---|
| 7,187,795 B2 * | 3/2007 | Jones et al. | 382/135 |
| 7,273,181 B2 * | 9/2007 | White et al. | 235/486 |
| 7,606,557 B2 * | 10/2009 | Park et al. | 455/410 |
| 2001/0027401 A1 | 10/2001 | Klein | |
| 2003/0132853 A1 | 7/2003 | Ebert | |
| 2003/0163396 A1 | 8/2003 | Blankevoort et al. | |
| 2005/0193199 A1 | 9/2005 | Asokan et al. | |
| 2005/0234823 A1 | 10/2005 | Schimpf | |
| 2006/0174129 A1 * | 8/2006 | Brignone et al. | 713/181 |
| 2006/0180661 A1 | 8/2006 | Grant et al. | |
| 2006/0181397 A1 * | 8/2006 | Limbachiya | 340/10.51 |
| 2006/0279412 A1 | 12/2006 | Holland et al. | |
| 2007/0234058 A1 | 10/2007 | White | |
| 2008/0104413 A1 | 5/2008 | Brunet et al. | |

FOREIGN PATENT DOCUMENTS

| | | |
|---|---|---|
| WO | 2005/008563 A2 | 1/2005 |
| WO | 2008/086393 A1 | 7/2008 |

OTHER PUBLICATIONS

Perera, Asankha C., et al., "Location Tracker System", National University of Singapore, (May 8, 2003), pp. 1-10.
Ilic, A. et al., "Synchronized Secrets Approach for RFID-enabled Anti-Counterfeiting", First International Conference on the Internet of Things (2008), pp. 137-140.

* cited by examiner

*Primary Examiner* — James Yang
(74) *Attorney, Agent, or Firm* — Brake Hughes Bellermann LLP

(57) ABSTRACT

A duplication detection module may be configured to determine if data on a RFID tag is encoded. If the data on the RFID tag is not encoded, the duplication detection module may determine that the RFID tag is a duplicate RFID tag and that an item associated with the duplicate RFID tag is counterfeit. If the data on the RFID tag is encoded, the duplication detection module may cause the decoder to decode the data on the RFID tag using a private key of a receiving party as a decoding parameter. The module may check for an item identifier and a sender identifier as a part of the encoded data, determine whether the item identifier has previously been read to determine if the RFID tag was duplicated during transport and compare the sender identifier with an expected sender identifier to determine if the RFID tag was duplicated during transport.

15 Claims, 4 Drawing Sheets

DUPLICATION DETECTION FOR NON-CRYPTOGRAPHIC RFID TAGS USING ENCRYPTED TRACEABILITY INFORMATION

TECHNICAL FIELD

This description relates to cryptographic radio frequency identification (RFID) tags using encrypted traceability information.

BACKGROUND

With the globalization of production and trade, counterfeiting of products has become a serious problem. One approach to fight counterfeiting is the use of technical countermeasures. For example, a common approach is equipping products with security features and using backend software for the verification of the security-equipped products, i.e., giving an answer to the question whether a product is genuine or counterfeit. This approach may be referred to as product authentication.

In one example, RFID tags may be used as an enabler for product authentication. For instance, the RFID tags may be attached to products and may enable the unique identification of products at an instance level. This means a RFID tag may be attached to each product instance ("item") and the RFID tag may store specific data for the respective product instance or item.

Although the use of RFID tags has the potential to enable product authentication, one or more potential issues may have to be overcome in order for the use of RFID tags to reveal its full strength. One issue, for example, is RFID tag duplication. Tag duplication means reading data of one RFID tag and writing the same data to another RFID tag. In the context of counterfeiting, an adversary may read the RFID tag of a genuine item and write identical data to a RFID tag attached to a counterfeit item, with the intention of circumventing product authentication mechanisms. Consequently, solutions are needed to overcome this issue related to RFID tag duplication as well as other issues.

SUMMARY

In one general aspect, a method may include receiving, at a receiving party, an item having a radio frequency identification (RFID) tag associated with the item, the RFID tag including data stored on the RFID tag. The method may include reading the data stored on the RFID tag and determining if the data on the RFID tag is encoded. If the data on the RFID tag is not encoded, it may be determined that the RFID tag is a duplicate RFID tag and the item is counterfeit. If the data on the RFID is encoded, the data on the RFID may be decoded using a private key of the receiving party as a decoding parameter. The method may include checking for an item identifier and a sender identifier as a part of the encoded data, determining whether the item identifier has previously been read to determine if the RFID tag was duplicated during transport and comparing the sender identifier with an expected sender identifier to determine if the RFID tag was duplicated during transport.

Implementations may include one or more of the following features. For example, the method may include determining the item is counterfeit if the data on the RFID tag cannot be decoded using the private key of the receiving party. In one exemplary implementation, decoding the data on the RFID tag may include decoding the data on the RFID tag using the private key of the receiving party only by a valid receiving party. The method may further include storing the expected sender identifier and the item identifier locally at the receiving party. In one exemplary implementation, the method may include storing the expected sender identifier and the item identifier in a non-centralized repository that is only accessible by the receiving party.

In another general aspect, a computer program product will detect duplicate RFID tags where the computer program product is tangibly embodied on a computer-readable medium and includes executable code that, when executed, is configured to cause at least one data processing apparatus to execute the duplication detection module. The duplication detection module may be configured to determine if data on a RFID tag received by a receiving party is encoded. If the data on the RFID tag is not encoded, the duplication detection module may be configured to determine that the RFID tag is a duplicate RFID tag and that an item associated with a duplicate RFID tag is counterfeit. If the data on the RFID tag is encoded, the duplication detection module may be configured to cause a decoder to decode the data on the RFID tag using a private key of the receiving party as a decoding parameter. The duplication detection module may be configured to check for an item identifier and a sender identifier as a part of the encoded data, determine whether the item identifier has previously been read to determine if the RFID tag was duplicated during transport and compare the sender identifier with an expected sender identifier to determine if the RFID tag was duplicated during transport.

Implementations may include one or more of the following features. For example, a computer program product may further include executable code that, when executed, is configured to cause the data processing apparatus to execute the duplication detection module, where the duplication detection module is further configured to determine the item is counterfeit if the data on the RFID tag cannot be decoded using the private key of the receiving party. In one exemplary implementation, the expected sender identifier and the item identifier may be stored locally at the receiving party. In one exemplary implementation, the expected sender identifier and the item identifier may be stored in a non-centralized repository that is only accessible by the receiving party.

In another general aspect, a RFID tag may include a receiver module that is arranged and configured to receive an encrypted item identifier and an encrypted sender identifier from a sending party, where the encrypted item identifier and the encrypted sender identifier are encrypted using a public key of a receiving party. The RFID tag may include a storage module that is arranged and configured to store the encrypted item identifier and the encrypted sender identifier. The encrypted item identifier and the encrypted sender identifier may be decodable only by the receiving party using a private key to authenticate the RFID tag.

Implementations may include one or more of the following features. For example, the encrypted sender identifier may be encoded and compared to an expected sender identifier. The encrypted item identifier may be a unique identifier of an item associated with the RFID tag.

In another general aspect, a system may include a decoder that is arranged and configured to read data stored on a RFID tag and a duplication detection module that is operably coupled to the decoder and that is arranged and configured to determine if data on a RFID tag received by a receiving party is encoded. If the data on the RFID tag is not encoded, the duplication detection module may be configured to determine that the RFID tag is a duplicate RFID tag and that an item associated with the duplicate RFID tag is counterfeit. If the data on the RFID tag is encoded, the duplication detection module may be configured to cause the decoder to decode the data on the RFID tag using a private key of the receiving party as a decoding parameter. The duplication detection module may be configured to check for an item identifier and a sender identifier as a part of the encoded data, determine whether the item identifier has previously been read to determine if the RFID tag was duplicated during transport and compare the sender identifier with an expected sender identifier to determine if the RFID tag was duplicated during transport.

Implementations may include one or more of the following features. For example, the duplication detection module may be further arranged and configured to determine if the item is counterfeit if the data on the RFID tag cannot be decoded using the private key of the receiving party. The decoder may be arranged to configure to decode the data of the RFID tag using a private key of the receiving party.

The system may further include an identifier repository that is operably coupled to the duplication detection module and that is arranged to configured to store the expected sender identifier and the item identifier locally at the receiving party. In one exemplary implementation, the identifier repository may be arranged and configured to store the expected sender identifier and the item identifier in a non-centralized repository that is only accessible by the receiving party. The system may further include an encoder that is operably coupled to the duplication detection module and that is arranged and configured to encode RFID tags with a unique item identifier and the sender identifier using the public key of the receiving party as one of the encryption parameters.

The details of one or more implementations are set forth in the accompanying drawings and the description below. Other features will be apparent from the description and drawings, and from the claims.

DETAILED DESCRIPTION

Figure 1:
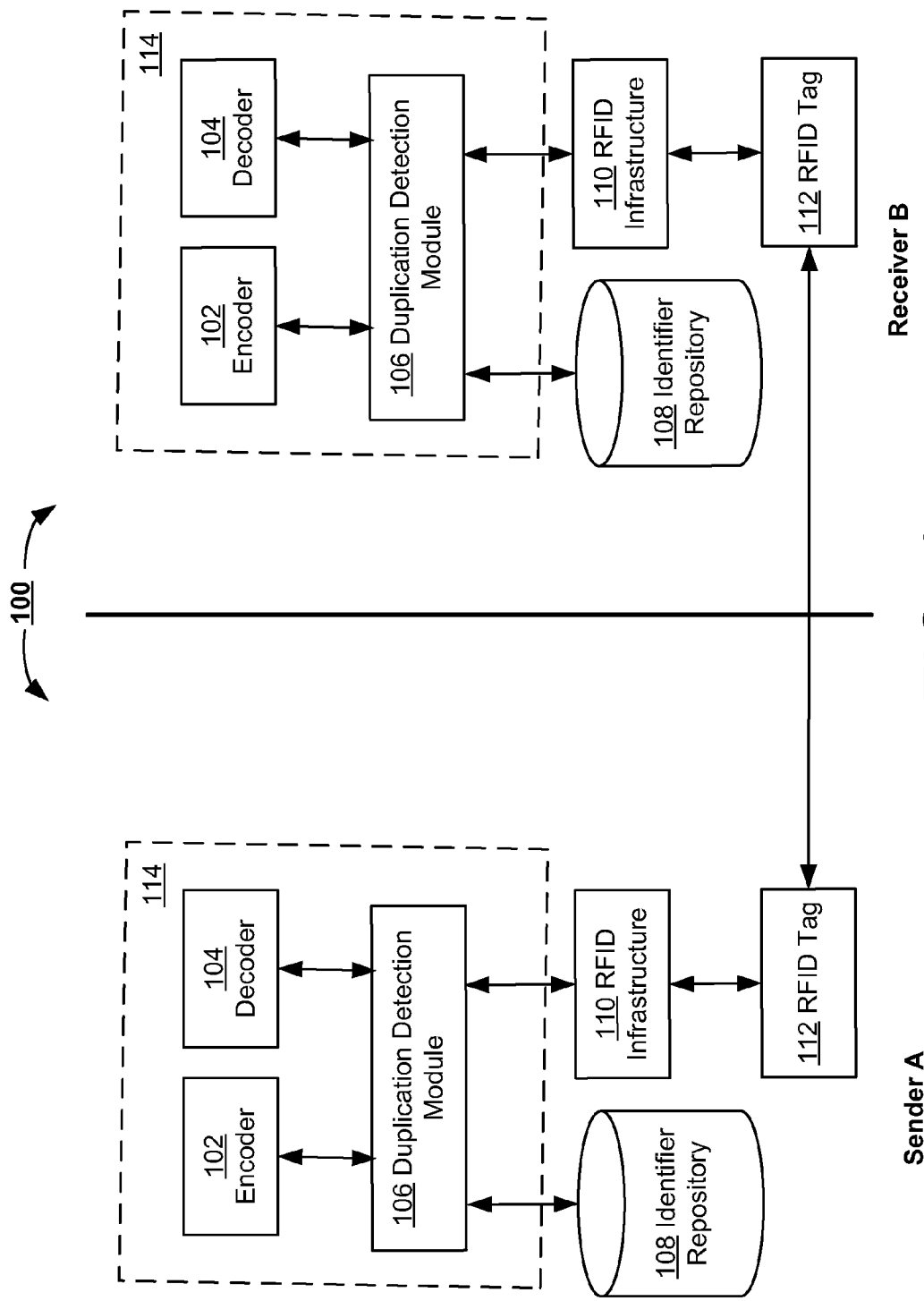
FIG. 1 is an exemplary block diagram of a system for detecting duplicate RFID tags.

In general, this document describes systems and techniques to detect RFID tag duplication. In one example, RFID tags may be used to track items through the supply chain. For example, consumer goods may be tagged with RFID tags and may be tracked by the manufacturer to the ultimate retailer. The ultimate retailer wants to ensure that the items received are genuine items from the expected manufacturer and not counterfeit or false items from a different manufacturer. To ensure that the items are genuine items, the retailer may need systems and techniques to detect whether a RFID tag has been duplicated, which may indicate that a counterfeit item has been inserted in the supply chain and/or that a counterfeit item has replaced a genuine item in the supply chain.

In one exemplary implementation, to detect RFID tag duplication, the sending party may encode the RFID tag with information that may only be decoded by the designated receiving party. In one exemplary implementation, the sending party may encode the RFID tag with an item identifier and a sender identifier. The sending party may encrypt the information using asymmetric cryptography. For example, the sending party may use a public key associated with the receiving party such that only the receiving party may decode the information contained on the RFID tag. The receiving party may decode the information and may check whether the information has already been read and/or compare the information with expected information. For instance, the receiving party may check to see if the item identifier has already been read and, if so, then the RFID tag may be a duplicate tag. The receiving party also may check the sender identifier with the identity of the expected sender. If the sender identifier matches the identity of the expected sender, then it is likely that the item is a genuine item. If the sender identifier does not match the identity of the expected sender, then the RFID tag may be a duplicate tag and the item may be counterfeit.

In one exemplary implementation, the systems and techniques described in this document do not rely on a central repository of identifiers in order to ensure that the duplicate RFID tags may be detected. In this example, the encoded information may be shared between two trusted parties without relying on a central repository to access and/or verify the information. Each of the parties may maintain a repository that contains the information needed to verify that the RFID tags are non-duplicated RFID tags. In this manner, the trusted relationship is between the two parties without reliance on a third party. A party may be both a sending party and a receiving party. For instance, a party may have many trusted relationships with different parties within the supply chain. A party that provides distribution services between manufacturers and retailers may have relationships with both manufacturers and retailers, where the distributor is receiving goods from different manufacturers and sending the goods to different retailers.

FIG. 1 is an exemplary block diagram of a duplication detection system 100. In this figure, a 'SenderA' may be configured to send items having RFID tags to a 'Receiver B.' Each of the parties may have a duplication detection system 100 to enable each of the parties to detect duplicate RFID tags. FIG. 1 shows two instances of the duplication detection system 100 with one system at the Sender A and another system at the Receiver B.

The system 100 may include an encoder 102, a decoder 104, a duplication detection module 106, an identifier repository 108, a RFID infrastructure 110, and a RFID tag 112. The system 100 also may include a computing device 114, which may be used to implement the encoder 102, the decoder 104 and the duplication detection module 106. In some implementations, the computing device 114 also may be used to implement the identifier repository 108. The RFID infrastructure 110 may be operably coupled to the computing device 114.

The encoder 102 may be arranged and configured to encode information that is to be stored on the RFID tag 112. For example, the Sender A may use the encoder 102 to encode an item identifier and a sender identifier. The encoder 102 may use asymmetric cryptography techniques to perform the encoding operations of the item identifier and the sender identifier.

In one exemplary implementation, the asymmetric cryptography may allow the secure transmission of arbitrary data using public and private keys. The encoder 102 may be configured to encode the item information and the sender information using a public key of the designated receiving party as one of the encryption parameters. To ensure that only the designated receiver may decode the information, the private key of the designated receiving party such as, in this case Receiver B, may be used. Receiver B may make his public key available to the sender through anyone of numerous transmission means, including both secure and non-secure means. Receiver B maintains the private key in confidence, without sharing the private key with other parties, including Sender A. The encoder 102 may use any other random string of information along with the public key of Receiver B to encode the item information and the sender identifier using asymmetric cryptography techniques.

The encoder 102 may be implemented as software, hardware, or a combination of hardware and software. The encoder 102 may be implemented on the computing device 114 as a computer program product embodied on a tangible medium, where the medium is a component (not shown) of the computing device 114. The encoder 102 may be operably coupled with the duplication detection module 106. The encoder 102 may send information to and receive information from the duplication detection module 106.

The decoder 104 may be arranged and configured to decode data on the RFID tag 112. In one exemplary implementation, the decoder 104 may use asymmetric cryptography techniques to decode the data on the RFID tags. For instance, Receiver B may use the decoder 104 to decode the information encoded by Sender A using the encoder 102. The decoder 104 may use the private key of the receiving party to decode the data on the RFID tags. Since only Receiver B has its private key, only Receiver B may properly decode the information on the RFID tags.

The decoder 104 may be implemented as software, hardware, or a combination of hardware and software. In one exemplary implementation, the decoder 104 may be implemented on the computing device 114 as a computer program product embodied on a tangible medium, where the tangible medium is a component (not shown) of the computing device 114. The decoder 104 may be operably coupled to the duplication detection module 106. The decoder 104 may send information to and receive information from the duplication detection module 106.

The identifier repository 108 maybe arranged and configured to store identifier information as well as public key information. For example, the identifier repository 108 may be configured to store the item identifier and/or the expected sender identifier. The identifier repository 108 also may be configured to store the public key information for the receiving parties, who have made their public key information available to the sending party.

The identifier repository 108 may be a local repository that is local to the sending party or the receiving party. In this manner, the identifier information is stored locally and is not stored in a centralized repository that is accessible by multiple parties. The identifier repository 108 may be arranged and configured such that it is accessible by only a single party.

In other exemplary implementations, the control of access to the identifier repository 108 may be controlled by a single party such as either Sender A or Receiver B. As illustrated in FIG. 1, each party may have their own identifier repository 108 over which that party controls access. The identifier repository 108 may be implemented as a database on the computing device 114. The identifier repository 108 may be a computer programmed product that is implemented on a tangible medium, where the tangible medium may be a component of the computing device 114. The identifier repository 108 may be operably coupled to the duplication detection module 106.

The RFID infrastructure 110 may be arranged and configured to read and write data to RFID tags such as, for example, RFID tag 112. The RFID infrastructure 110 may be operably coupled with the duplication detection module 106. The RFID infrastructure 110 may include a RFID reader, a RFID writer, or a combined RFID reader and writer. In this manner, the RFID infrastructure 110 may write data to the RFID tag 112 as instructed by the detection duplication module 106. Similarly, the RFID infrastructure 110 may read data from the RFID tag 112. Although the RFID tag 112 is illustrated as a single entity, the RFID tag 112 is meant to illustrate multiple RFID tags.

The duplication detection module 106 may be operably coupled to the encoder 102, the decoder 104, the identifier repository 108 and the RFID infrastructure 110. The duplication detection module 106 may be implemented on the computing device 114. The duplication detection module 106 may be implemented as software, hardware, or a combination of hardware and software. In one exemplary implementation, the duplication detection module 106 may be implemented as computing program product embodied on a tangible medium, where the tangible medium is a component of the computing device 114.

The duplication detection module 106 may be arranged and configured to detect whether or not RFID tags are duplicate tags. In making this determination, the duplication detection module 106 may use the information encoded on the RFID tags. For instance, when an item is received at the receiving party such as Receiver B, the duplication detection module 106 may be used to determine if the RFID tag 112 is a genuine tag or a duplicate tag. Determining if the RFID tag 112 is a duplicate RFID tag also may include determining whether or not the item associated with the RFID tag 112 is a genuine item or a counterfeit item. The fact that a RFID tag is a duplicate RFID tag is a strong indicator that the item associated with the tag is a counterfeit item and not a genuine item that the sender intended the receiver to receive.

When the RFID tag 112 has been read by the RFID infrastructure 110, the duplication detection module 106 may be configured to determine if the data on the RFID tag 112 received by the receiving party is encoded. If the data on the RFID tag 112 is not encoded, then the RFID tag 112 may contain duplicated data. For instance, if the data on the RFID tag is not encoded and only stores an unencoded item identifier, then the RFID tag 112 may contain duplicated data. This may mean that an item associated with the RFID tag which may be marked for a consumer has been used as a template for duplication.

If the data on the RFID tag 112 is encoded but the RFID tag 112 cannot be decoded, then Receiver B may not be the valid receiver. This may prevent a common attack where a cloned item is inserted in the supply chain at a different point from where it was taken from. Results from the processes performed by the duplication detection module 106 may be made available to a user of the RFID infrastructure 110 and/or the computing device 114. For example, indications may be displayed to a user whether or not the RFID tag is a duplicate tag or an expected RFID tag and thus whether or not the item associated with the RFID tag is a genuine item or a potential counterfeit item.

The duplication detection module 106 may be configured to check if the item identifier encoded on the RFID tag has already been read. Receiver B may store a list of item identifiers that have been read from RFID tags in the identifier repository 108. When a new RFID tag has been read and decoded, the duplication detection module 106 may check the item identifier on the new RFID tag against a list of previously read item identifiers stored in the identifier repository 108. If the item identifier has already been read and is stored in the identifier repository 108, then an adversary may have duplicated this new RFID tag during transport from the previous supply chain location. The item identifiers are unique identifiers. Thus, if a duplicate item identifier appears on a second RFID tag, then the receiving party knows that the RFID tag is a duplicate and the item associated with the RFID tag is a potential counterfeit item.

The duplication detection module 106 also may be configured to compare the sender identifier with the identity of expected sender. As discussed above, the identity of the expected sender may be stored in the identifier repository 108. The identity of the expected sender may be communicated from the sending party to the receiving party by other means. For example, the identity of expected sender may be transmitted on an order either electronically or by paper. The identity of the expected sender also may be sent by other communication means including electronic messaging.

If the sender identifier matches the identity of the expected sender, then the receiving party knows that the RFID tag and the item associated with the RFID tag is the genuine item sent by the sending party. If the sender identifier does not equal the identity of the expected sender, then it has not been sent by the expected sender and is likely to be a duplicate RFID tag and the item associated with the RFID tag is a potential counterfeit item.

By using both the sender identifier and the item identifier, the receiving party can distinguish between two items that contain the same item identifier. In this manner, the duplication detection module 106 may definitively determine which of the two items is the genuine item and which is the counterfeit item.

The system 100 may be used by non-adjacent partners in the supply chain. For example, a consumer goods manufacturer may be the sending party such as Sender A. Sender A may use a central logistics clearinghouse through which their products are shipped to multiple different retailers. Other manufacturers also may use the same central logistics clearinghouse to ship their products. Thus, between the sender and the ultimate end retailer, there may be ample opportunity for counterfeit items to be inserted in the supply chain, which may end up at the ultimate receiver and be passed off as the genuine item.

The sending party may have and desire a trusted relationship with the end retailer and likewise the end retailer may desire a trusted relationship with the sender so that the receiving party knows the items being received are genuine items and not counterfeit items. System 100 helps to assure both parties that the items received at the receiving party can be positively determined to be genuine or counterfeit by determining whether the RFID tags associated with the items have been duplicated using the techniques described above with respect to system 100. System 100 may be used for any type of industry and any type of goods to which RFID tags may be associated and/or affixed. This may be especially important for retailers to know that they have received genuine items such as high value brand name items, where these items may be routinely counterfeited and passed off as the genuine item.

Figure 2:
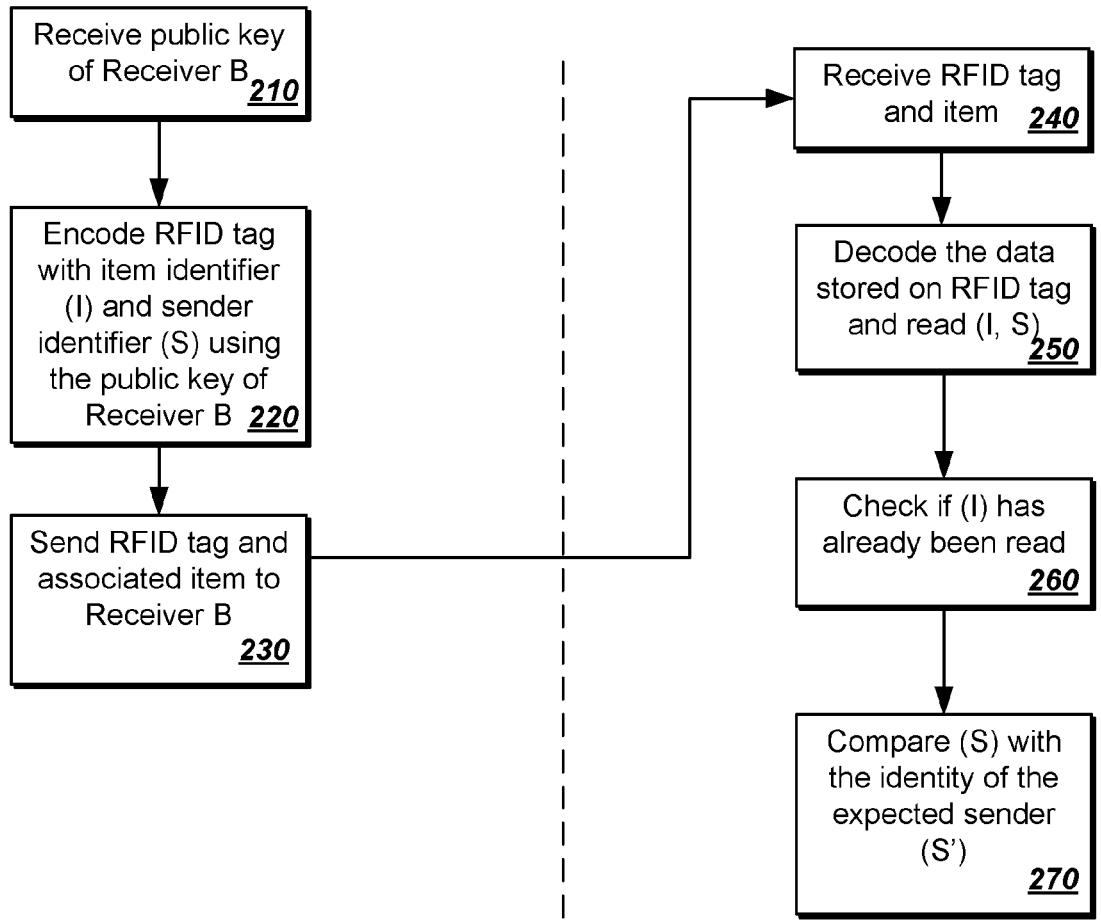
FIG. 2 is an exemplary swim lane diagram of example operations of the system of FIG. 1.

Referring to FIG. 2, an exemplary swim lane diagram 200 is illustrated. Swim lane diagram 200 illustrates example operations of the system 100 of FIG. 1. The swim lane diagram 200 illustrates two parties namely, Sender A and Receiver B. Sender A receives the public key of Receiver B (210). The public key of Receiver B may be made available to Sender A in a variety of different ways. Receiver B may communicate the public key information over a wireless and/or wired communication channel including, but not limited to the Internet, electronic message or otherwise.

Sender A may encode the RFID tag with an item identifier (I) and a sender identifier (S) using the public key of Receiver B (220). For example, the encoder 102 may be configured to encode the RFID tag with the item identifier (I) and the sender identifier (S) using the public key of Receiver B (220). The duplication detection module 106 may be configured to cause the encoder 102 to encode this information and to cause the RFID infrastructure 110 to write the information to the RFID tag 112.

Sender A may then send the RFID tag and an item associated with the RFID tag to Receiver B (230). It is not necessary that Sender A and Receiver B be adjacent partners in the supply chain. As discussed above, Sender A and Receiver B may be non-adjacent partners in the supply chain. In this manner, the RFID tag and the item associated with the RFID tag may be processed and passed through other parties within the supply chain before ultimately being received by Receiver B. Furthermore, Receiver B may become a sender and send the RFID tag and the associated item to another trusted party. In this case, Receiver B then functions as a sender and encodes the RFID tag with the item identifier and its own sender identifier using the public key of the receiver in the relationship with Receiver B.

Receiver B then receives the RFID tag and the item (240). The data stored on the RFID tag is read and decoded (250). For example, the RFID infrastructure 110 may be configured to read the data on the RFID tag. The data is then communicated to the duplication detection module 106.

The duplication detection module 106 may be configured to determine if the data read by the RFID infrastructure 110 is encoded data. If the data on the tag is not encoded, and, for example, only stores an plain text item identifier, then the tag may contain duplicated data. This may mean that a product that has been marked for the consumer has been used as a template for duplication.

If the RFID tag contains encoded data, then the duplication detection module 106 causes the decoder 104 to decode the data. If the decoder 104 is not able to decode the data, then Receiver B is not the valid receiver. In this manner, the duplication detection module 106 has detected a common attack by an adversary where a cloned item is inserted in the supply chain at a different point from where it was taken.

The duplication detection module 106 may then check if the item identifier (I) has already been read (260). If the item identifier (I) has already been read, then it is likely that an adversary has duplicated this RFID tag during transport from the previous supply chain location. As discussed above, the duplication detection module 106 may be configured to compare the item identifier (I) to item identifiers stored in the identifier repository 108.

The duplication detection module 106 also may compare the sender identifier (S) with the identity of the expected sender (S') (270). If S does not equal S', then the RFID tag and the item associated with the RFID tag has not been sent by the expected sender and is likely to be a counterfeit item. If S equals S', then the item was sent by Sender A and Receiver B can be assured that the RFID tag has not been duplicated and that the item associated with the RFID tag is a genuine item.

Figure 3:
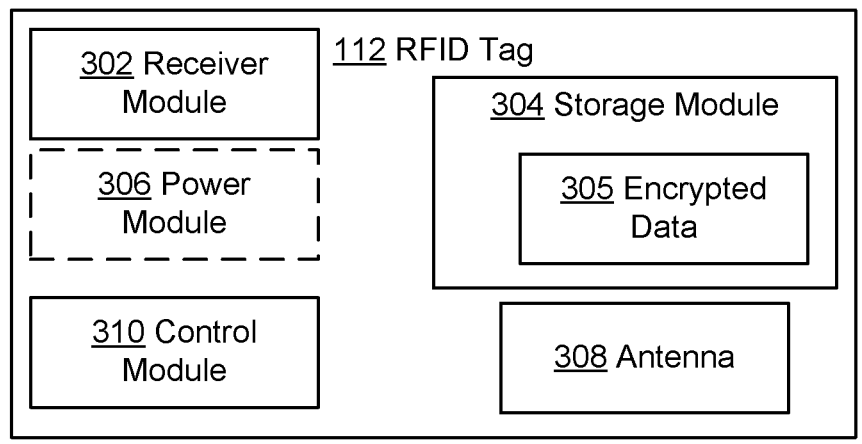
FIG. 3 is an exemplary block diagram of a RFID tag.

FIG. 3 is an exemplary block diagram of a RFID tag 112. The RFID tag 112 may include a receiver module 302, a storage module 304 containing encrypted data 305, an optional power module 306, an antenna 308 and a control module 310. The RFID tag 112 may be a passive RFID tag, an active RFID tag, or a semi-passive RFID tag. If the RFID tag is a passive RFID tag, then the optional power module 306 may not be included. In a passive RFID tag, an RFID reader may provide power to the RFID tag such that the information on the RFID tag may be read using the antenna 308. If the RFID tag is an active RFID tag, then the optional power module 306 may be included. The antenna 308 may be used to transmit and receive information to and from the RFID infrastructure, such as RFID infrastructure 110 of FIG. 1.

The receiver module 102 may be arranged and configured to receive an encrypted item identifier and an encrypted sender identifier from a sending party. The encrypted item identifier and the encrypted sender identifier may be encrypted using a public key of a receiving party. As discussed above, by using the private key of the designated receiving party, only the receiving party may decode the encrypted item identifier and the encrypted sender identifier.

The storage module 304 may be arranged and configured to store the encrypted item identifier and the encrypted sender identifier, identified collectively in the figure as encrypted data 305. The control module 310 may be arranged and configured to control the operation of the overall unit including the receiver module 302, the storage module 304, the optional power module 306, and the antenna 308. The RFID tag 112 may be implemented on an integrated circuit. The control module 310 may include one or more processors or chips that may include one or more application programs or computer program products or software that control the operation of the device. By encoding this particular information on the RFID tag 112, the receiving party may use the encoded information to determine whether or not the RFID tag has been duplicated or is a duplicate RFID tag.

Figure 4:
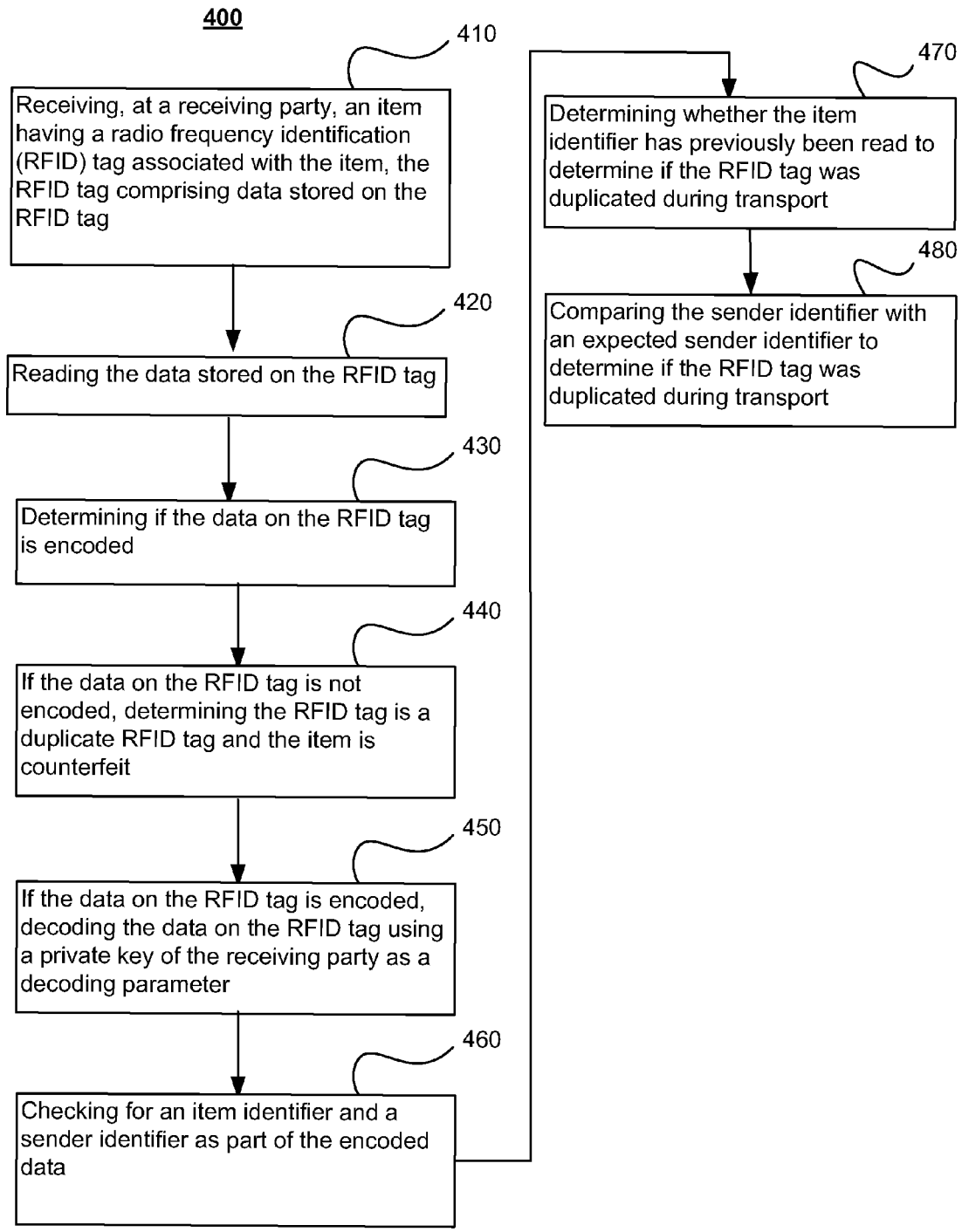
FIG. 4 is an exemplary flowchart illustrating example operations of the system of FIG. 1.

FIG. 4 is an exemplary flowchart of a process 400 illustrating example operations of the system 100 of FIG. 1. Process 400 may be used by a receiving party to detect for duplicate RFID tags. Process 400 may include receiving, at a receiving party, an item having a RFID tag associated with the item, where the RFID tag includes data stored on the RFID tag (410). The data stored on the RFID tag may be read (420). For example, the RFID infrastructure 110 may be configured to read the data stored on the RFID tag (420).

Process 400 also may include determining if the data on the RFID tag is encoded (430). For example, the duplication detection module 106 may be configured to determine if the data on the RFID tag is encoded (430). If the data on the RFID tag is not encoded, it may be determined that the RFID tag is a duplicate RFID tag and the item is counterfeit (440). For instance, the duplication detection module 106 may determine that the RFID tag is not encoded and thus it may be concluded that the RFID tag is a duplicate RFID tag (440).

If the data on the RFID tag is encoded, then the data on the RFID tag may be decoded using a private key of the receiving party as a decoding parameter (450). For example, the duplication detection module 106 may be configured to determine whether the RFID tag is encoded and, if so, cause the decoder 104 to decode the data on the RFID tag using the private key of the receiving party as the decoding parameter. In this manner, only the designated receiving party may decode the information contained on the RFID tag, as intended by the trusted sending party.

Process 400 also may include checking for an item identifier and a sender identifier as part of the encoded data (460). For example, the duplication detection module 106 may be configured to check for an item identifier and a sender identifier part of the encoded data (460). Process 400 also includes determining whether the item identifier has previously been read to determine if the RFID tag was duplicated during transport (470). For example, as discussed above, the duplication detection module 106 may compare the item identifier encoded on the RFID tag to previously received item identifiers stored in the identifier repository 108 to determine whether the item identifier has previously been read. If the item identifier has previously been read, then it is likely that the RFID tag is a duplicate tag. If the item identifier has not been previously read when the comparison is made against other item identifiers in the item repository 108, then the duplication detection module 106 knows that the item identifier was not copied and placed on a counterfeit tag.

The sender identifier may be compared with an expected sender identifier to determine if the RFID tag was duplicated during transport (480). For example, the duplication detection module 106 may compare the sender identifier with an expected sender identifier stored in the identifier repository 108 to determine if the RFID tag was duplicated during transport (480).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   creating, at a receiving party, a list of previously read item identifiers, wherein the list of previously read item identifiers includes item identifiers that have been read by a radio frequency identification (RFID) reader at the receiving party;
   receiving, at the receiving party, an item having an RFID tag associated with the item, the RFID tag comprising data stored on the RFID tag;
   reading, by the receiving party, the data stored on the RFID tag using the RFID reader at the receiving party;
   determining if the data on the RFID tag is encoded or plain text;
   if the data on the RFID tag is plain text, determining the RFID tag is a duplicate RFID tag and the item is counterfeit;
   if the data on the RFID tag is encoded, decoding the data on the RFID tag using a private key of the receiving party as a decoding parameter;
   checking for an item identifier and a sender identifier as a part of the encoded data;
   determining whether the item identifier has previously been read by the RFID reader at the receiving party to determine if the RFID tag was duplicated during transport by comparing the item identifier against the list of previously read item identifiers by the RFID reader at the receiving party;
   if the item identifier matches a previously read item identifier, determining the RFID tag is a duplicate tag and the item is counterfeit;
   if the item identifier does not match a previously read item identifier, updating the list of previously read item identifiers by adding the item identifier to the list;
   comparing the sender identifier with an expected sender identifier to determine if the RFID tag was duplicated during transport; and
   if the sender identifier does not match the expected sender identifier, determining the RFID tag is a duplicate tag and the item is counterfeit.

2. The method as in claim 1 further comprising if the data on the RFID tag cannot be decoded using the private key of the receiving party, determining the item is counterfeit.

3. The method as in claim 1 wherein decoding the data on the RFID tag comprises decoding the data on the RFID tag using the private key of the receiving party only by a valid receiving party.

4. The method as in claim 1 further comprising storing the expected sender identifier and the item identifier locally at the receiving party.

5. The method as in claim 1 further comprising storing the expected sender identifier and the item identifier in a non-centralized repository that is only accessible by the receiving party.

6. A computer program product for detecting duplicate radio frequency identification (RFID) tags, the computer program product being tangibly embodied on a non-transitory computer-readable medium and including executable code that, when executed, is configured to cause at least one data processing apparatus to execute a duplication detection module, the duplication detection module configured to:
   create a list of previously read item identifiers, wherein the list of previously read item identifiers includes item identifiers that have been read by an RFID reader at a receiving party;
   determine if data on a RFID tag received by the receiving party is encoded or plain text using the RFID reader at the receiving party;
   if the data on the RFID tag is plain text, determine that the RFID tag is a duplicate RFID tag and that an item associated with the duplicate RFID tag is counterfeit;
   if the data on the RFID tag is encoded, cause a decoder to decode the data on the RFID tag using a private key of the receiving party as a decoding parameter;
   check for an item identifier and a sender identifier as a part of the encoded data;
   determine whether the item identifier has previously been read by the RFID reader at the receiving party to determine if the RFID tag was duplicated during transport, by comparing the item identifier against the list of previously read item identifiers by the RFID reader at the receiving party;
   if the item identifier matches a previously read item identifier, determine the RFID tag is a duplicate tag and the item is counterfeit;
   if the item identifier does not match a previously read item identifier, update the list of previously read item identifiers by adding the item identifier to the list;
   compare the sender identifier with an expected sender identifier to determine if the RFID tag was duplicated during transport; and
   if the sender identifier does not match the expected sender identifier, determine the RFID tag is a duplicate tag and the item is counterfeit.

7. The computer program product of claim 6 further comprising executable code that, when executed, is configured to cause the data processing apparatus to execute the duplication detection module, the duplication detection module further configured to, if the data on the RFID tag cannot be decoded using the private key of the receiving party, determine the item is counterfeit.

8. The computer program product of claim 6 wherein the expected sender identifier and the item identifier are stored locally at the receiving party.

9. The computer program product of claim 6 wherein the expected sender identifier and the item identifier are stored in a non-centralized repository that is only accessible by the receiving party.

10. A system comprising:
a decoder that is arranged and configured to read data stored on a radio frequency identification (RFID) tag; and
a duplication detection module that is operably coupled to the decoder and that is arranged and configured to:
create a list of previously read item identifiers, wherein the list of previously read item identifiers includes item identifiers that have been read by an RFID reader at a receiving party;
determine if data on a RFID tag received by the receiving party is encoded or plain text using the RFID reader at the receiving party;
if the data on the RFID tag is plain text, determine that the RFID tag is a duplicate RFID tag and that an item associated with the duplicate RFID tag is counterfeit;
if the data on the RFID tag is encoded, cause the decoder to decode the data on the RFID tag using a private key of the receiving party as a decoding parameter;
check for an item identifier and a sender identifier as a part of the encoded data;
determine whether the item identifier has previously been read by the RFID reader at the receiving party to determine if the RFID tag was duplicated during transport, by comparing the item identifier against the list of previously read item identifiers by the RFID reader at the receiving party;
if the item identifier matches a previously read item identifier, determine the RFID tag is a duplicate tag and the item is counterfeit;
if the item identifier does not match a previously read item identifier, update the list of previously read item identifiers by adding the item identifier to the list;
compare the sender identifier with an expected sender identifier to determine if the RFID tag was duplicated during transport; and
if the sender identifier does not match the expected sender identifier, determine the RFID tag is a duplicate tag and the item is counterfeit.

11. The system of claim 10 wherein the duplication detection module is further arranged and configured to determine the item is counterfeit if the data on the RFID tag cannot be decoded using the private key of the receiving party.

12. The system of claim 10 wherein the decoder is arranged and configured to decode the data on the RFID tag using the private key of the receiving party.

13. The system of claim 10 further comprising an identifier repository that is operably coupled to the duplication detection module and that is arranged and configured to store the expected sender identifier and the item identifier locally at the receiving party.

14. The system of claim 10 further comprising an identifier repository that is operably coupled to the duplication detection module and that is arranged and configured to store the expected sender identifier and the item identifier in a non-centralized repository that is only accessible by the receiving party.

15. The system of claim 10 further comprising an encoder that is operably coupled to the duplication detection module and that is arranged and configured to encode RFID tags with a unique item identifier and the sender identifier using the public key of the receiving party as one of the encryption parameters.

* * * * *